Oct. 23, 1956  R. L. SKINNER  2,768,034
MECHANICAL BEARING
Filed Feb. 19, 1953  2 Sheets-Sheet 1
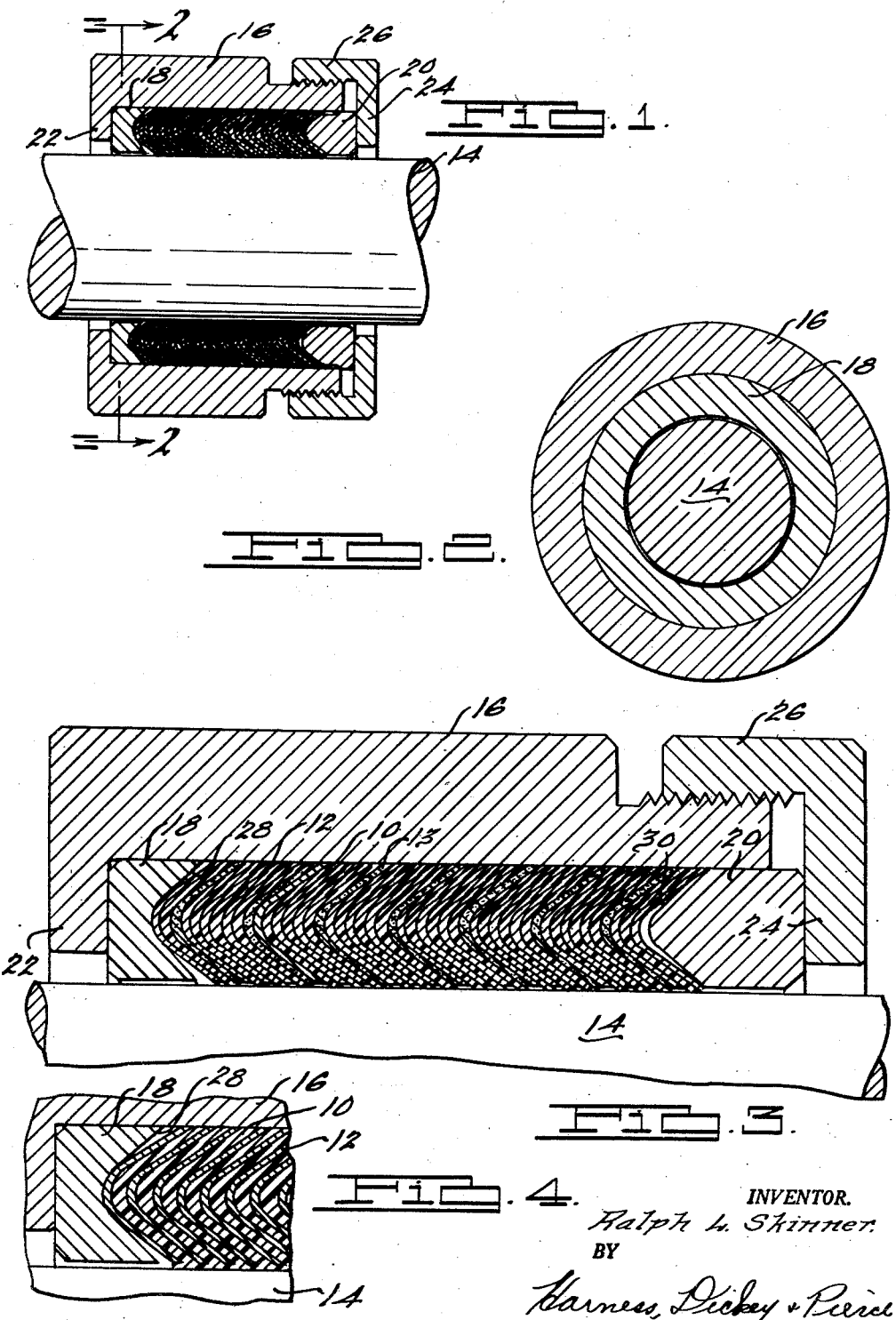
INVENTOR.
Ralph L. Skinner.
BY
Harness, Dickey & Pierce.
ATTORNEYS.

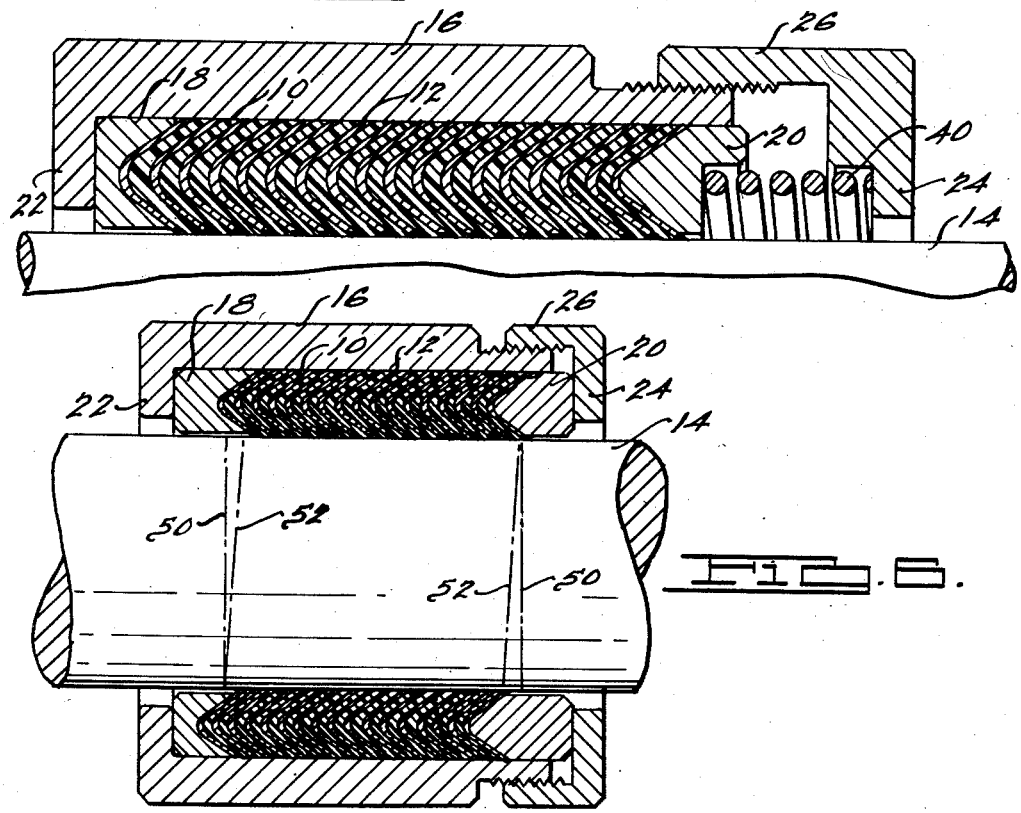
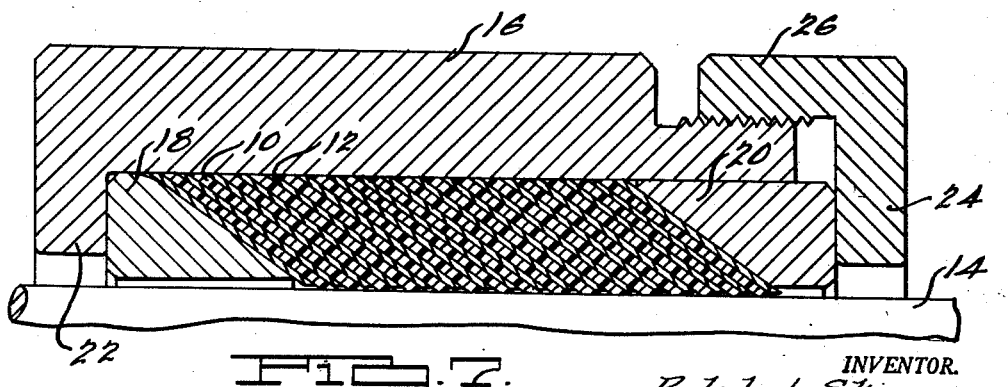

United States Patent Office 2,768,034
Patented Oct. 23, 1956

2,768,034
MECHANICAL BEARING
Ralph L. Skinner, Detroit, Mich.
Application February 19, 1953, Serial No. 337,756
14 Claims. (Cl. 308—77)

This invention relates to new and useful improvements in mechanical bearings.

An important object of the invention is to provide a bearing that is constructed from a plurality of component parts placed side by side and wherein various of the component parts can be assembled together to provide a bearing of desired length.

Another object of the invention is to provide a mechanical bearing having essentially low friction characteristics and which resists wear to assure a long and useful life for the bearing.

Still another object of the invention is to provide a bearing of the above-mentioned character that is adjustable to compensate for wear so as to eliminate play between the bearing and the part supported thereby and to maintain the bearing in proper association with the part at all times.

Yet another object of the invention is to provide a mechanical bearing wherein the bearing surface is of plastic material having excellent antifriction characteristics and of a known type readily available on the market and which includes novel means for maintaining the temperature of the bearing below the fusion or disintegration temperature of the plastic material so as to prevent the bearing from being destroyed by heat created in use or otherwise present in the bearing environment.

Other objects and advantages of the invention will be apparent during the course of the following description.

In the drawings forming a part of this specification and wherein like numerals are employed to designate like parts throughout the same:

Fig. 1 is a longitudinal sectional view through a bearing assembly embodying the invention and showing the same for purpose of illustration surrounding and in operative association with a central shaft, Fig. 2 is a transverse sectional view taken on the line 2—2 of Fig. 1, Fig. 3 is an enlarged fragmentary view similar to Fig. 1 illustrating in greater detail the unique structural features of the bearing, Fig. 4 is a fragmentary view similar to Fig. 3 and illustrating a modified bearing construction within the scope of this invention, Fig. 5 is an enlarged fragmentary view similar to Fig. 3 and illustrating a modified means for maintaining the bearing under yielding pressure to compensate automatically for wear of the bearing parts, Fig. 6 is a view similar to Fig. 1 illustrating a modified bearing arrangement wherein the individual component parts of the bearing are arranged so as to prevent the parts from wearing into or scoring the part supported thereby, and Fig. 7 is an enlarged fragmentary view similar to Fig. 5 but illustrating a modified form of bearing element.

Plastic materials of the type employed in this invention have excellent antifriction properties which make them suitable as bearings, but they have an undesirable characteristic which heretofore has prevented them from being used extensively in the bearing art, viz., they tend to break down or fuse at temperatures commonly present in bearings. As a matter of fact, plastic materials of the type used in the bearing of this invention are among the best heat and electrical insulators known today, and this characteristic has made it exceedingly difficult to adapt this material for bearing purposes so that the desirable characteristics thereof can be utilized in bearings. Heretofore it has been possible to use plastic materials only under conditions where heat built up in the bearing is exceedingly low. Manifestly, this limitation has restricted the use of plastics to an exceedingly small portion of the bearing field.

It has now been discovered that these plastic materials can be used as bearings in environments which develop relatively high temperatures if the plastic is separated, in effect, into essentially thin sections by a media capable of withdrawing heat away from the bearing surface substantially as rapidly as it is formed. In this manner heat at the bearing surface is maintained below the destructive temperature and the beneficial characteristics of the plastic can be utilized without having also to accept the undesirable effects heretofore encountered. It is necessary first of all that the means for absorbing heat from the bearing surface be embedded in the plastic and that it extend to a point in close proximity to the bearing surface. In practice, the heat absorbing means must be sufficiently close to the bearing surface so that the latter can not become heated to a tempertaure which is destructive of the plastic. In general, however, it is desirable that the heat absorbing means not extend to the bearing surface as the metallic elements best suited for this purpose do not as a rule have as desirable bearing characteristics as the plastic and it usually is desirable to utilize the latter exclusively for the bearing. It is contemplated that discrete metal particles be embedded in and distributed uniformly through the plastic material as a means for withdrawing heat from the bearing surface but by far the most expeditious way of accomplishing the intended result is to form the plastic and the metal into essentially thin ring-shaped reeds or plates and to arrange the plastic and metal plates in generally alternate relation. In addition, it is necessary that some means be provided in heat-exchange relation with the heat-absorbing means that will remove heat from the latter substantially as rapidly as it is withdrawn from the bearing surface.

Reference is first had to the form of the invention shown in Figs. 1, 2, and 3. As shown, the bearing comprises a plurality of annular V-grooved bearing elements 10 of plastic material intermingled with similarly shaped elements 12 of a material having a relatively high coefficient of thermal conductivity. In the form of the invention shown, the bearing is adapted to fit around and support a shaft 14 that may be rotatable or reciprocable or both, but it will be readily apparent that it makes no difference whether the shaft moves in the bearing or the bearing moves on the shaft. As suggested, both of the elements 10 and 12 are generally V-shaped in transverse section and a plurality of these elements are nested together side by side. Any desired number of the elements 10 and 12 may be assembled together in the bearing, and in any particular instance the number employed may vary depending upon the conditions obtaining in use and the particular environment in which the bearing is employed. Also, the two types of elements 10 and 12 can be intermingled in any desired order. For example, the elements 10 and 12 can be arranged alternately throughout the entire length of the bearing; or, if desired, two or more similar elements can be grouped together periodically or at regular intervals. In Figs.

1 and 3 the elements 10 and 12 are shown arranged generally alternately, but at periodic intervals a metal element 13 is assembled together with one of the metallic elements 12. The two metallic elements 12 and 13 are identical in every respect except that the elements 13 are made of a porous metal which is impregnated with graphite, oil, or other lubricant. When the elements 12 are used in the manner illustrated, lubricant exudes exceedingly slowly from the confining pores of the elements and lubricates the shaft or other part supported by the bearing. It will be readily appreciated, in this connection, that the lubricant containing elements 13 can be spaced any desired distance apart along the length of the bearing. Manifestly, the number of these elements 13 incorporated per unit length of the bearing may vary, depending upon the exigencies of the particular situation.

It is significant that the plastic elements 10 extend inwardly slightly beyond the other elements 12 so that only the plastic elements are in actual physical engagement with the shaft 14. In every instance the elements 12 are spaced away from the shaft 14 so that they do not engage or in any manner actually physically contact the shaft; however, it is of particular significance that the inner edges of the elements 12 are disposed relatively close to the corresponding edges of the plastic elements 10 so that they readily withdraw and absorb heat from the shaft supporting edges of the elements 10. The distance the inner edges of the metal elements 12 are spaced behind the inner bearing edges of the plastic elements 10 may vary, depending upon the exigencies of the particular situation, but a spacing of from .010 to 0.020 inches has been found satisfactory for most purposes.

Any suitable plastic material can be used for the bearing elements 10 and different plastic materials may well be needed under different conditions of use. In most instances it will be necessary of course to use a plastic material that is essentially tough and strong and that has a sufficiently low coefficient of friction to withstand wear and abrasion to which it invariably is subjected in use. Also, it is desirable to use a plastic material having good thermal stability or resistance to heat. It is desirable that the plastic elements 10 be yieldable and flexible within limits so that they can be made slightly undersized with respect to the shaft 14 and stretched over the shaft. It will be readily apparent hereinafter, however, that it is not absolutely essential that the plastic elements 10 be undersized, as most of the plastic materials suitable for use in this invention will cold-flow and thus adapt themselves to the shaft if properly confined and compressed. In addition to the above, it is desirable to select a plastic material having resistance to corrosive agents and solvents. This characteristic may be absolutely essential under certain conditions of use as in the case of a bearing for the impeller shaft of a pump adapted to handle acids or other corrosive liquids. Almost all plastic materials that are useful as bearing elements in this invention have the unique ability of being able to absorb or "swallow" abrasive particles and thus prevent the shaft or other part 14 supported thereby from being scored or otherwise damaged by small abrasive particles that work their way between the shaft and the bearing. Plastic materials of the type here contemplated permit the abrasive particles to penetrate entirely into the plastic without splitting or otherwise damaging the plastic. In actual practice, the abrasive particle embeds itself into the plastic, and the latter, by reason of its cold-flow properties, molds itself around the particle. The plastic is relatively soft so that the particle penetrates essentially quickly into the plastic and the fact that it does not long remain on the bearing surface of the plastic element assures that the shaft 14 will not be damaged. There is of course a limit to the amount of abrasive grit that can be taken up by the plastic elements, but the capacity of the elements to absorb the abrasive particles is relatively great, and this capacity is not exceeded under most conditions of use.

The properties of known plastic materials are readily available in handbooks and trade publications, and plastics having the necessary physical properites can be readily ascertained by reference to these sources of information. The polytetrafluoroethylene plastic known in the trade as "Teflon" and the synthetic fiber-forming polymeric amide known and sold to the trade as "nylon" have been found to be particularly suitable.

While it is contemplated that any material having a sufficiently high coefficient of thermal conductivity to dissipate heat from the bearing edges of the elements 10 under the conditions of use can be employed for the component elements 12, metal is by far the most practical material. Any metal is satisfactory for most purposes, but it is of course preferred to use those metals having the highest coefficient of thermal conductivity. Copper has been found to be satisfactory under a wide variety of conditions.

It is absolutely essential that the plastic bearing elements 10 be essentially thin and maximum benefit is obtained if each plastic element is separated by at least one of the metal elements 12. In actual practice, however, the thickness of the plastic elements 10 may vary somewhat depending upon the particular conditions of use. Manifestly, the plastic material can be made relatively thicker where the bearing is to be used under conditions developing relatively low heat. As the heat developed in use increases it is necessary to progressively reduce the thickness of the elements 10 in order to avoid fusing or melting of the material. Thicknesses in the order of .015 inches are necessary for most operating conditions, and under certain high temperature conditions of operation it may be necessary to use plastic elements which are even thinner. Surpisingly enough, it has been found that these very thin plastic elements stand up exceedingly well if a relatively large number of them are incorporated in a single bearing structure as illustrated in the drawings. When assembled in this manner and maintained properly compacted in the assembly, the plastic elements exhibit a collective strength which is adequate to support even high-speed rotating or reciprocating shafts and to withstand attending vibrations and other destructive forces generated under high-speed operating conditions.

The metal elements 12 also preferably are essentially thin but in this instance the thickness dimension is not as critical as in the case of the plastic elements 10. It is desirable that the metal bearing elements be relatively thin in order that they do not hold the plastic elements too far apart. Excessive spreading or separation of the plastic elements 10 makes the unit load on each element relatively great and thus unduly increases the work each element is required to do in performing its intended function. Metal elements having a thickness of .010 inch have been found adequate to carry away heat developed under high-speed operating conditions, and metal elements of this thickness separate the plastic elements properly so that they stand up well under high-speed operation.

As suggested, the plastic elements 10 preferably are made with their internal diametrical dimensions slightly smaller than the diameter of the shaft 14 so that an interference fit is established when the elements are pushed onto the shaft. In practice, the plastic material from which the elements 10 are made is sufficiently yieldable that the elements, when made thin as contemplated here, can be easily pressed onto the shaft. Also, it is desirable that the inner edges of the elements 10 be beveled as shown so that the inner bevel edges are substantially parallel to the axis of the element. When thus beveled, the inner edges of the elements 10 engage flatly against the peripheral surface of the shaft 14, as shown.

In the case of the metal elements 12, the inner diametrical dimension is slightly larger than the diameter of the shaft 14 so that the metallic elements are spaced radially outwardly from the circumference of the shaft. Thus the metal elements 12 do not actually physically engage the shaft and they do not perform a bearing function. However, the metal elements 12 are sufficiently close to the bearing edges of the plastic members 10 that they absorb heat from these bearing edges as rapidly as it is formed by the frictional contact thereof with the shaft 15 or otherwise.

Some means is of course necessary to maintain the assembled plastic and metal elements 10 and 12 properly assembled and in precise coaxial relation. This is accomplished in the illustrated bearing by a generally cylindrical bearing housing 16. As shown in the drawings, the elements 10 and 12 fit snugly within and are confined against radial movement by the inner cylindrical wall of the housing 16. It is particularly significant in this connection that both the plastic elements 10 and the metallic elements 12 are in actual physical contact with the housing 16. As suggested, this physical contact between the elements 10 and 12 and the housing 16 maintains the bearing elements properly assembled and in exact coaxial relation. However, physical contact between the metallic elements 12 and the housing 16 also serves a second equally important function. This contact between the metal elements 12 and the housing 16 provides a direct means for transferring heat from the elements to the housing. In this connection it will be observed that the housing 16 is essentially massive so that it is capable of absorbing substantial heat from the elements 12. Thus, the metallic elements 12 provide heat transfer paths between the plastic elements 10 along which heat travels from the bearing edges of the plastic elements to the relatively large massive housing 16. In actual practice, of course, the bearing housing 16 may be assembled in a large casting or the like which greatly increases the media available for absorbing heat. The important thing in so far as the present invention is concerned is that the metal elements 12 be spaced from but in close proximity to the bearing edges of the plastic elements 10 and that the metal elements 12 be in physical contact at the outer edges thereof with a body of metal or the like having a high coefficient of thermal conductivity and capable of rapidly absorbing heat transferred thereto by the metallic elements.

Manifestly, the elements 10 and 12 must be confined against axial as well as radial displacement. To this end, the assembled elements are confined between a rear or backup retaining ring 18 and a front retaining ring 20. The backup ring 18, in turn, is held by a radially inwardly extending flange 22 on the housing 16. The front retaining ring 20 extends forwardly of the housing 16 and is engaged by the radially inwardly extending flange portion 24 of a collar 26 which is threaded on the housing as shown in Figs. 1 and 3. The two rings 18 and 20 fit the housing 16 relatively snugly and the forward ring 20 is slidable in the housing. Thus, the collar 26 can be tightened on the housing 16 to press the front retaining ring 20 against the assembled bearing elements 10 and 12 and thus compact these elements into a tightly assembled unit.

An annular V groove 28 provided in the inner face of the backup ring 18 receives the endmost bearing element. The front retaining ring 20 is tapered as at 30 from opposite sides toward the middle thereof in the direction of the bearing elements, and the tapered extension fits into the V groove of the adjacent bearing element. It is significant that the included angle of the V groove 28 is larger than the corresponding angle of the elements 10 and 12 so that the sides of the groove flare outwardly away from the adjacent element. It is further significant that the included angle of the tapered portion 30 of the front retaining ring 20 is larger than the corresponding angle of the adjacent bearing element so that the ring engages the bearing element at or adjacent the edges and is spaced progressively away from the element toward the middle thereof. Thus, when the collar 26 is tightened to compress the assembled bearing elements 10 and 12 between the retaining rings 18 and 20, the rings mutually cooperate with the bearing elements to spread the latter. In this manner, all of the bearing elements 10 and 12 are urged radially outwardly against the housing 16 and the plastic elements are pressed against the shaft 14.

The retaining rings 18 and 20 not only serve to restrain the assembled bearing elements 10 and 12 and to hold the same pressed against the shaft 14 and the housing 16 but they also serve to compensate for any wear which occurs in the plastic elements. By reason of the inherent characteristics of the plastic material from which the elements 10 are made, very little wear occurs, but it is desirable to compensate for such wear as does occur. This is an important feature of the invention and one which contributes substantially to the success of using plastic materials in a bearing. Plastic materials of the type here contemplated have the property of cold-flow; that is, under pressure the plastic material gradually flows or deforms into a space readily available to it. Although these plastic materials are sufficiently tough and strong to retain generally their original shape they will extrude or expand slightly in a radial direction when compressed with sufficient force. Thus, inasmuch as each plastic element is confined on opposite sides thereof by the metallic element 12 and/or 13 at the outer side thereof by the housing 16 and at the inner side by the shaft or other part 14, any slight variation in the dimensions of the plastic bearing elements due to wear which occurs by reason of frictional contact between these elements and the shaft 14 can be compensated by merely tightening the collar 26. This causes the plastic material of the elements 10 to flow from the middle toward the edges thereof. In this manner the elements 10 can be made to fit the shaft at all times and any looseness which gradually develops in all bearings with use can be eliminated by periodic adjustments of the collar 26. If desired, the middle portions of the plastic elements 10 can be made slightly thicker than the edge portions thereof in order to provide a reserve of material for the extrusion effect. In the drawings the elements 10 are shown formed in this manner. In this connection it should be pointed out that the plastic elements 10, by reason of the cold-flow characteristics referred to above, tend to flow into the spaces between the inner edges of the metallic elements 12 and 13 and the shaft 14. In fact, after a period of time, plastic material from the elements 10 may substantially entirely fill these spaces. However, this does not in any way affect the operativeness of the composite bearing as the radial dimensions of these spaces are so small that the metallic elements are adequate to withdraw heat developed in use. Also, it should be noted that there is no tendency for the individual plastic elements to adhere under these conditions, and even though adjacent plastic elements come into contact or engagement with each other under the conditions referred to above, cracks or joints remain between the plastic elements through which lubricant from the elements 13 can pass to the shaft.

The form of the invention shown in Fig. 4 is identical to the form hereinabove described except that the metal bearing elements 10 are embedded or molded in the plastic material so that the latter presents a continuous bearing surface to the shaft 14. By reason of the extensive plastic bearing surface afforded by this construction, somewhat greater heat will be developed at the bearing surface than in the bearing of Fig. 1. However, under certain conditions of use the modified construction is entirely satisfactory. Also, the modified bearing is able to withstand much higher temperatures than heretofore because the metallic elements 12 are maintained in such close proximity to the bearing surface that they are effective to withdraw heat rapidly and efficiently therefrom.

The form of the invention shown in Fig. 5 is substantially the same as the form shown in Figs. 1–3 except that a helical spring 40 is interposed between the front retaining ring 20 and the flange portion 24 of the collar 26. In this form of the invention force exerted by the collar 26 is transmitted to the retaining ring 20 and thence to the assembled bearing elements 10 and 12 through the spring 40. Since the latter is constantly compressed in use it exerts a continuing force against the assembled bearing elements and thus tends automatically to compensate for wear in the plastic elements 10. Of course, if necessary or desirable, the collar 26 can be tightened from time to time to maintain the spring 40 substantially uniformly loaded.

The form of the invention shown in Fig. 6 also is substantially the same as the form shown in Figs. 1–3. The only difference in the modified construction is that the bearing elements 10 and 12 are inclined obliquely with respect to the longitudinal axis of the shaft 14. In the drawings, the lines 50 and 52 indicate the angle of inclination of the bearing elements. In order to maintain the elements 10 and 12 at the proper angle the retaining rings 18 and 20 are cut on a corresponding angle or taper. In Fig. 6, the backup ring 18 is shown as decreasing gradually in thickness from the top to the bottom thereof and, conversely, the front retaining ring 20 is shown as increasing gradually in thickness from the top to the bottom thereof. While it has general utility and can be used anywhere, this construction is particularly suited for situations where the shaft 14 is of relatively soft material since it prevents the thin knife-like edges of the bearing elements 10 from gradually scoring or grooving the shaft. By reason of the inclined position of the elements 10, each element engages the shaft over a relatively wide area and is thus sustained by a much larger surface of the shaft than would be the case if the elements were at exactly right angles to the axis of the shaft.

The form of the invention shown in Fig. 7 is substantially the same as the form of the invention first described except that modified bearing elements 10 and 12 are used and the retaining rings 18 and 20 are correspondingly modified. In this form of the invention both of the elements 10 and 12 are frusto-conical in form, and the confronting radial faces of the retaining rings 18 and 20 are correspondingly shaped to complement and flatly engage the bearing elements. It will be readily apparent, however, that all of the advantages inherent in the form of the invention first described are present in the modified construction and that the assembled parts of the latter function in the same manner to achieve the same results as the corresponding elements in the first form of the invention.

Having thus described the invention, I claim:

1. A mechanical bearing having essentially low friction characteristics comprising a bearing of plastic material having a portion adapted to engage and support a part movable relative thereto, a bearing support having substantial bulk to assure good heat-absorbing capacity and a relatively high coefficient of thermal conductivity physically contacting said bearing over a substantial area remote from the mentioned portion thereof, elements each having a high coefficient of thermal conductivity in said bearing extending from points behind but adjacent to said bearing portion so as not to engage said part to and in heat exchange relation with said support, said elements being essentially uniformly distributed through the bearing so as to provide multiple paths along which heat is conducted from the bearing portion to said support, and means for maintaining said plastic material in intimate contact with said movable part at all times.

2. A mechanical bearing having essentially low friction characteristics comprising a bearing support, a plurality of axially spaced corresponding and essentially thin annular bearing elements of plastic material having essentially low friction characteristics carried by the support, annular spacers of a material having a relatively high coefficient of thermal conductivity interposed between said bearing elements, said bearing elements engaging edgewise against said support and being positioned and held thereby with the opposite edges thereof disposed to define collectively a bearing for a moving part, said spacers disposed behind said opposite edges of the bearing elements so as not to contact the part supported by said elements and physically contacting said bearing support so as to conduct heat essentially rapidly away from the edges of said bearing elements which form the bearing surface and to conduct the absorbed heat to said bearing support, and means for maintaining end pressure on said bearing so as to hold said bearing elements in intimate contact with the part supported thereby and for extruding the plastic material of said bearing elements from between said spacers to compensate for wear of the bearing elements occurring in use.

3. A mechanical bearing having essentially low friction characteristics comprising a plurality of essentially thin annular rings disposed side by side and in coaxial relation, certain of said rings being of a plastic material having good antifriction characteristics, corresponding edges of said certain rings being aligned precisely with respect to each other and said aligned edges adapted to simultaneously engage and collectively support a bearinged part, the other of said rings being of metallic composition having a relatively high coefficient of thermal conductivity, the edges of said other rings being spaced behind but disposed in close proximity to the bearing edges of said plastic rings so as not to engage said bearinged part and to absorb heat essentially rapidly from the bearing edges of the plastic rings, means physically contacting said metallic rings also having a relatively high coefficient of thermal conductivity adapted to absorb heat from said rings, and means for maintaining end pressure on the bearing operative to maintain said plastic rings in intimate contact with said bearinged part at all times.

4. The combination as set forth in claim 3 wherein said rings are V-grooved in transverse section and nested together side by side, and wherein said heat absorbing means has a cylindrical surface engaged by corresponding edges of the rings, said cylindrical surface positioning and retaining the plastic rings for proper engagement with a part to be supported by the bearing, and positioning and retaining the metal rings in proper heat exchange relation with the bearing edges of said plastic rings.

5. The combination as set forth in claim 3 wherein said rings are generally frusto-conical form and nested together side by side, and wherein said heat absorbing means has a cylindrical surface engaged by corresponding edges of the rings, said cylindrical surface positioning and retaining the plastic rings for proper engagement with a part to be supported by the bearing, and positioning and retaining the metal rings in proper heat exchange relation with the bearing edges of said plastic rings.

6. The combination as set forth in claim 3 wherein said rings are disposed obliquely with respect to the axis of the bearing.

7. A mechanical bearing having low friction characteristics comprising a plurality of essentially thin, annular elements disposed side by side and in coaxial relation, said elements being generally V-shaped in transverse section, certain of said elements being of a plastic material having good antifriction characteristics and other of said elements being of a material having a relatively high coefficient of thermal conductivity, corresponding edges of said certain elements being beveled and the bevel surfaces disposed parallel to the axes of said elements and collectively defining a bearing support for a part with which the bearing is adapted to be used, said other elements terminating behind but in proximity to the beveled bearing surfaces of said certain elements so as not to engage the parts supported by the bearing but sufficiently close to the bearing surfaces to absorb heat generated in use from said surfaces, a bearing support engaging all of said elements and operative to hold the same properly positioned in coaxial relation and coactive with said other elements to absorb and dissipate heat conducted thereby from said bearing surfaces, a stationary retaining ring behind said elements having an annular V-shaped recess receiving the endmost element, and the walls of said recess being outwardly divergent with respect to the adjacent side of said endmost element, a movable retaining ring in front of said elements, the side of said movable ring adjacent to the elements being tapered toward the middle thereof and in the direction of said elements, the taper angle of said movable ring being greater than the taper angle of said elements so that said movable ring engages the adjacent element at least initially adjacent the edges thereof and is spaced from the middle portion of said element, and means for pressing said movable retaining ring against said elements so as to compress the latter into a compact group, the tapered surfaces of said retaining rings cooperating with the elements to press said bearing surfaces against the part engaged thereby and maintaining pressure on said plastic elements tending to extrude the latter in the direction of the part to compensate for wear of the plastic.

8. The combination as set forth in claim 7 wherein said last-mentioned means comprises a spring bearing against said movable retaining ring urging the latter yieldably in the direction of and adjacent said bearing elements.

9. The combination as set forth in claim 7 wherein said last-mentioned means comprises a spring bearing against said movable retaining ring urging the latter yieldably in the direction of and adjacent said bearing elements, and means for varying the tension of said spring.

10. The combination as set forth in claim 7 wherein at least some of said other elements are porous and wherein the porous elements contain a lubricant which exudes slowly in use to lubricate the bearing surface.

11. A composite plastic and metal bearing having a plastic bearing surface adapted to engage a part to be supported by the bearing, the metal portion of said bearing characterized by a high coefficient of thermal conductivity and consisting of a plurality of discrete metal pieces imbedded in and substantially uniformly distributed through the plastic, said metal pieces extending from points behind and adjacent to the mentioned surface of the plastic to the opposite side thereof, a body having a high coefficient of thermal conductivity contacting and in heat exchange relation with said metal pieces at said opposite side of the plastic, said metal pieces being spaced from said bearing surface so as not to engage said part and operative to absorb heat constantly from the bearing surface of the plastic in use and to transmit said heat through the bearing to said body, and means at opposite ends of the composite bearing for applying pressure axially thereagainst so as to compress the plastic material in use and cause it to extrude from between said metal pieces toward the bearing surface to compensate for wear of the plastic and to maintain said plastic material at all times between said metal pieces and the part supported by said bearing.

12. A mechanical bearing having essentially low friction characteristics comprising a plurality of essentially thin annular rings disposed side by side and in coaxial relation, certain of said rings being of plastic material having good antifriction characteristics, corresponding edges of said certain rings being aligned precisely with respect to each other and said aligned edges adapted to engage simultaneously and to collectively support a bearinged part, the other of said rings being of metallic composition having a relatively high coefficient of thermal conductivity, the edges of said other rings being spaced behind but disposed in close proximity to the bearing edges of said plastic rings so as not to engage said bearinged part and to absorb heat essentialy rapidly from the bearing edges of the plastic rings, and a bearing support physically contacting said metallic rings also having a relatively high coefficient of thermal conductivity adapted to absorb heat from said rings, said bearing support including means at opposite ends of the assembled rings engaging and confining said rings, at least one of said means being adjustable relative to said assembled rings, and a threaded collar on the bearing support engaging said adjustable means whereby tightening of said collar exerts pressure on said adjustable means tending to compress and compact all of said rings.

13. A mechanical bearing having essentially low friction characteristics comprising a plurality of essentially thin annular rings disposed side by side and in coaxial relation, certain of said rings being of plastic material having good antifriction characteristics, corresponding edges of said certain rings being aligned precisely with respect to each other and said aligned edges adapted to engage simultaneously and to collectively support a bearinged part, the other of said rings being of metallic composition having a relatively high coefficient of thermal conductivity, the edges of said other rings being spaced behind but disposed in close proximity to the bearing edges of said plastic rings so as not to engage said bearinged part and to absorb heat essentially rapidly from the bearing edges of the plastic rings, and a bearing support physically contacting said metallic rings also having a relatively high coefficient of thermal conductivity adapted to absorb heat from said rings, said bearing support including a movable pressure element in the bearing support engageable with the assembled rings of said bearing, a spring retainer, and a spring confined between said retainer and said pressure element operative to urge said pressure element yieldedly in the direction of said rings to urge said plastic rings constantly against the part supported by the bearing.

14. A mechanical bearing having essentially low friction characteristics comprising a plurality of essentially thin annular rings disposed side by side and in coaxial relation, certain of said rings being of plastic material having good antifriction characteristics, corresponding edges of said certain rings being aligned precisely with respect to each other and said aligned edges adapted to engage simultaneously and to collectively support a bearinged part, the other of said rings being of metallic composition having a relatively high coefficient of thermal conductivity, the edges of said other rings being spaced behind but disposed in close proximity to the bearing edges of said plastic rings so as not to engage said bearinged part and to absorb heat essentially rapidly from the bearing edges of the plastic rings, and a bearing support physically contacting said metallic rings also having a relatively high coefficient of thermal conductivity adapted to absorb heat from said rings, said bearing support including a movable pressure element engageable with the assembled rings of said bearing, a threaded collar on the bearing support, and a spring confined between the collar and said pressure element, said collar being adjustable to vary the tension of the spring and the latter urging said pressure element yieldably in the direction of said rings to maintain the latter constantly against the part supported by said bearing.

References Cited in the file of this patent

UNITED STATES PATENTS

| 1,345,534 | Crane | July 6, 1920 |
| 1,971,169 | Wheeler | Aug. 21, 1934 |
| 1,976,916 | Black | Oct. 16, 1934 |
| 2,118,855 | Miller | May 31, 1938 |
| 2,236,370 | Jackman | Mar. 25, 1941 |
| 2,444,874 | Hanson | July 6, 1948 |
| 2,459,598 | Scott | Jan. 18, 1949 |
| 2,525,747 | Hess | Oct. 10, 1950 |

FOREIGN PATENTS

| 561,165 | Great Britain | May 8, 1944 |